US011212257B2

(12) United States Patent
Miller et al.

(10) Patent No.: US 11,212,257 B2
(45) Date of Patent: Dec. 28, 2021

(54) MULTI-LEVEL SECURE ETHERNET SWITCH

(71) Applicant: Aeronix, Inc., Melbourne, FL (US)

(72) Inventors: Geoffrey Miller, Melbourne, FL (US); Terry Strickland, Melbourne, FL (US)

(73) Assignee: Aeronix, Inc., Melbourne, FL (US)

( * ) Notice: Subject to any disclaimer, the term of this patent is extended or adjusted under 35 U.S.C. 154(b) by 449 days.

(21) Appl. No.: 16/015,653

(22) Filed: Jun. 22, 2018

(65) Prior Publication Data

US 2019/0394165 A1 Dec. 26, 2019

(51) Int. Cl.
*H04L 29/06* (2006.01)
*H04L 12/931* (2013.01)
*H04L 12/46* (2006.01)
*H04L 9/32* (2006.01)

(52) U.S. Cl.
CPC ...... *H04L 63/0236* (2013.01); *H04L 12/4645* (2013.01); *H04L 49/351* (2013.01); *H04L 9/3236* (2013.01)

(58) Field of Classification Search
CPC ............ H04L 63/0236; H04L 12/4645; H04L 49/351; H04L 9/3236; H04L 29/06; G06F 21/55; G06F 21/70; G06F 21/82; G06F 21/85; G06F 21/86; G06F 21/87; G06F 9/00
USPC .......................................................... 726/3
See application file for complete search history.

(56) References Cited

U.S. PATENT DOCUMENTS

| | | | | |
|---|---|---|---|---|
| 5,944,822 A | * | 8/1999 | Cornils | G06F 13/364 726/1 |
| 5,996,077 A | * | 11/1999 | Williams | H04L 63/0823 726/12 |
| 6,215,816 B1 | * | 4/2001 | Gillespie | H04L 12/44 370/402 |
| 6,366,578 B1 | * | 4/2002 | Johnson | H04L 12/2856 370/353 |
| 6,643,612 B1 | | 11/2003 | Lahat et al. | |
| 6,898,632 B2 | | 5/2005 | Gordy et al. | |
| 6,901,072 B1 | | 5/2005 | Wong | |
| 7,266,117 B1 | | 9/2007 | Davis | |
| 7,388,958 B1 | * | 6/2008 | Maier | H04L 63/0485 380/270 |

(Continued)

*Primary Examiner* — Noura Zoubair
*Assistant Examiner* — Mahabub S Ahmed
(74) *Attorney, Agent, or Firm* — Kelly G. Swartz; Widerman Malek, PL

(57) ABSTRACT

A multi-level secure switch includes a security enforcer logic chip, a switch chip, a management processor, and a plurality of physical ports. The security enforcer logic chip is configured to receive and transmit a plurality of data packets, each having an associated security level. The switch chip is configured to transmit the data packets to and receive the data packets from the security enforcer logic chip. The management processor is configured to provide security parameters to the security enforcer logic chip. Each of the plurality of physical ports have an associated security threshold and transmit and receive data packets to and from the security enforcer logic chip. The security enforcer logic chip is configured to transmit a data packets to a physical port only when the security level associated with data packet is compatible with the security threshold associated with the physical ports.

14 Claims, 3 Drawing Sheets

(56) References Cited

U.S. PATENT DOCUMENTS

| | | | |
|---|---|---|---|
| 7,546,458 B1* | 6/2009 | Singla | H04L 12/4645 380/255 |
| 7,607,011 B1 | 10/2009 | Johnson et al. | |
| 7,607,167 B1* | 10/2009 | Johnson | H04L 45/56 709/201 |
| 7,626,990 B2 | 12/2009 | Wybenga et al. | |
| 7,636,369 B2 | 12/2009 | Wong | |
| 7,676,608 B1* | 3/2010 | Crosmer | G06F 21/554 710/36 |
| 7,681,036 B1* | 3/2010 | Zuber | H04B 1/406 713/166 |
| 7,701,957 B1 | 4/2010 | Bicknell | |
| 7,706,363 B1 | 4/2010 | Daniel et al. | |
| 7,715,437 B2 | 5/2010 | Denney et al. | |
| 7,792,046 B2 | 9/2010 | Kucharczyk et al. | |
| 7,826,481 B2 | 11/2010 | Kalkunte et al. | |
| 7,836,490 B2* | 11/2010 | Smith | H04L 63/083 726/4 |
| 8,369,344 B1* | 2/2013 | Krishnan | H04L 12/467 370/395.53 |
| 8,407,763 B2 | 3/2013 | Weller et al. | |
| 8,522,309 B2* | 8/2013 | Yoffe | G06F 21/55 726/2 |
| 8,539,571 B2 | 9/2013 | Smith | |
| 8,553,552 B2 | 10/2013 | Hu et al. | |
| 8,555,056 B2 | 10/2013 | Smith et al. | |
| 8,614,946 B1 | 12/2013 | Noble | |
| 8,665,869 B2 | 3/2014 | Breslin et al. | |
| 8,863,270 B2* | 10/2014 | Masiyowski | H04L 63/30 726/15 |
| 8,990,560 B2* | 3/2015 | Massey | H04L 69/12 713/166 |
| 9,237,158 B2 | 1/2016 | Smith | |
| 9,246,801 B1 | 1/2016 | Kompella | |
| 9,264,341 B2 | 2/2016 | Ma et al. | |
| 9,494,933 B1 | 11/2016 | Jackson | |
| 9,524,399 B1* | 12/2016 | Takahashi | G06F 21/78 |
| 9,542,006 B2* | 1/2017 | Softer | G06F 21/84 |
| 9,641,176 B2* | 5/2017 | Hammond | H03K 19/17736 |
| 9,660,966 B1* | 5/2017 | Marek | H04L 63/20 |
| 9,712,541 B1 | 7/2017 | Harris et al. | |
| 9,755,857 B2 | 9/2017 | Traversone et al. | |
| 9,755,947 B2 | 9/2017 | Munoz | |
| 10,205,733 B1* | 2/2019 | Park | H04L 63/1408 |
| 10,587,450 B1* | 3/2020 | Hartley | H04L 12/4641 |
| 10,791,091 B1* | 9/2020 | Sanders | H04L 63/162 |
| 2003/0221030 A1* | 11/2003 | Pontius | G06F 12/1483 710/107 |
| 2005/0089052 A1* | 4/2005 | Chen | H04M 1/2535 370/401 |
| 2005/0097357 A1* | 5/2005 | Smith | H04L 63/105 726/4 |
| 2005/0129033 A1 | 6/2005 | Gordy et al. | |
| 2006/0174112 A1* | 8/2006 | Wray | H04L 63/105 713/168 |
| 2007/0192621 A1* | 8/2007 | Li | H04L 63/0227 713/189 |
| 2010/0031342 A1* | 2/2010 | Vogsland | H04L 63/105 726/17 |
| 2010/0180350 A1* | 7/2010 | Glaubert | H04L 41/0681 726/34 |
| 2010/0250497 A1* | 9/2010 | Redlich | H04L 63/0227 707/661 |
| 2011/0145451 A1* | 6/2011 | Softer | G06F 21/82 710/64 |
| 2011/0283029 A1* | 11/2011 | Byers | H04L 63/20 710/107 |
| 2012/0066509 A1* | 3/2012 | Lapp | G06F 21/6218 713/189 |
| 2012/0163383 A1* | 6/2012 | Ech-Chergui | H04L 63/0428 370/392 |
| 2012/0166746 A1* | 6/2012 | Amar | G06F 21/74 711/163 |
| 2012/0210416 A1* | 8/2012 | Mihelich | H04L 67/1004 726/11 |
| 2012/0254980 A1* | 10/2012 | Takahashi | H04L 63/145 726/13 |
| 2012/0314659 A1* | 12/2012 | Schatzmayr | H04W 76/12 370/328 |
| 2013/0061034 A1 | 3/2013 | Walheim et al. | |
| 2013/0091579 A1* | 4/2013 | White | H01R 13/6633 726/25 |
| 2013/0212670 A1* | 8/2013 | Sutardja | H04L 63/162 726/13 |
| 2013/0332634 A1* | 12/2013 | Glaser | G06F 13/4286 710/104 |
| 2013/0343181 A1 | 12/2013 | Stroud et al. | |
| 2014/0019652 A1* | 1/2014 | Soffer | G06F 21/83 710/73 |
| 2015/0150073 A1* | 5/2015 | Bhalerao | H04L 63/105 726/1 |
| 2015/0154136 A1* | 6/2015 | Markovic | H04L 12/6418 710/317 |
| 2015/0263859 A1* | 9/2015 | Lietz | H04L 69/18 713/168 |
| 2017/0026040 A1* | 1/2017 | Hammond | H03K 19/003 |
| 2017/0026289 A1 | 1/2017 | Vinsel et al. | |
| 2017/0070507 A1* | 3/2017 | Leconte | H04L 63/10 |
| 2017/0075821 A1* | 3/2017 | Takahashi | H04L 63/0435 |
| 2017/0308723 A1* | 10/2017 | Soffer | H01R 4/4809 |
| 2017/0322765 A1* | 11/2017 | Gavin | H04M 3/205 |
| 2018/0225230 A1* | 8/2018 | Litichever | G06F 21/82 |
| 2018/0227317 A1* | 8/2018 | Xu | H04L 63/1466 |
| 2018/0239719 A1* | 8/2018 | Soffer | G06F 13/105 |
| 2018/0287820 A1* | 10/2018 | Mayer-Wolf | H04L 49/3009 |
| 2018/0307845 A1* | 10/2018 | Eckhardt | G06F 21/53 |
| 2018/0359244 A1* | 12/2018 | Cockerill | H04L 63/1441 |
| 2019/0207916 A1* | 7/2019 | Couillard | G06F 21/74 |
| 2019/0253440 A1* | 8/2019 | Mathur | H04L 63/1416 |
| 2019/0286842 A1* | 9/2019 | Keles | G06F 21/6245 |
| 2019/0373470 A1* | 12/2019 | Meredith | H04W 12/03 |

* cited by examiner

MULTI-LEVEL SECURE ETHERNET SWITCH

FIELD OF THE INVENTION

The present invention relates to systems and methods for secure Ethernet switches. More specifically, the present invention is related to a design for a data switch, which physically separates paths for data packets of differing security levels.

BACKGROUND

Existing multi-level secure switches for military applications require physical separation between data channels. Therefore, a need exists for a multi-level secure switch that advantageously switches data packets between a plurality of physical ports and provides a high data rate and low latency. There also exists a need for a multi-level secure switch that advantageously removes the multi-level separation burden from the management processor, provides flexibility of configuration, and eliminates the need for expensive secure operating systems.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a multi-level secure switch including a security enforcer logic chip, a switch chip, a management processor, and a plurality of physical ports. The security enforcer logic chip may be configured to receive a plurality of data packets, each having an associated security level. The switch chip may be configured to interface with the security enforcer logic chip. The management processor may be configured to interface with the security enforcer logic chip. The plurality of physical ports, each having an associated security threshold, may be configured to interface with the security enforcer logic chip. The security enforcer logic chip may be configured to provide one of the plurality of data packets to one of the plurality of physical ports only when the security level associated with the one of the plurality of data packets is compatible with the security threshold associated with the one of the plurality of physical ports.

The multi-level secure switch may also include a plurality of magnetic isolation transformers. Each of the plurality of magnetic isolation transformers may be in electrical communication with only one of the plurality of physical ports.

The switch chip may be further configured to receive one of the plurality of data packets from the security enforcer logic chip and provide the one of the plurality of data packets to a data path of the security enforcer logic chip associated with one of the plurality of physical ports.

The security enforcer logic chip may verify that the security level of the one of the plurality of data packets is compatible with the security threshold associated with the one of the plurality of physical ports.

The management processor may include a rules engine adapted to provide security rules to the security enforcer logic chip.

The security enforcer logic chip may append a security tag, indicative of the security level, to each of the plurality of data packets.

The security enforcer logic chip may examine the security tag of each of the plurality of data packets received from the switch chip and provide each of the plurality of data packets to one of the plurality of physical ports only when the security tag of the data packet meets the security threshold of the physical port.

The security threshold may be defined as accepting data packets associated with a single security level. The single security level may be determined by the rules engine.

The security threshold may be defined as accepting data packets associated with a plurality of security levels.

The single security level may be determined by the rules engine.

The security enforcer logic chip may examine the security tag of each of the plurality of data packets received from the switch chip and drop each of the plurality of data packets when the security tag of the data packet does not meet the security threshold of the physical port.

The security enforcer logic chip may remove the security tag from each of the plurality of data packets received from the switch chip prior to providing the data packet to the physical port.

The security enforcer logic chip may retain the security tag appended to each of the plurality of data packets and provide the security tag and the data packet to the physical port.

The security enforcer logic chip may include a plurality of data pathways, wherein each of the plurality of pathways is isolated from each of the other pathways and each of the plurality of pathways connects a single output of the switch chip with a single physical port.

The management processor may be configured to receive one of the plurality of data packets only when the data packet is specifically designated for the management processor.

DETAILED DESCRIPTION OF THE INVENTION

Figure 1:
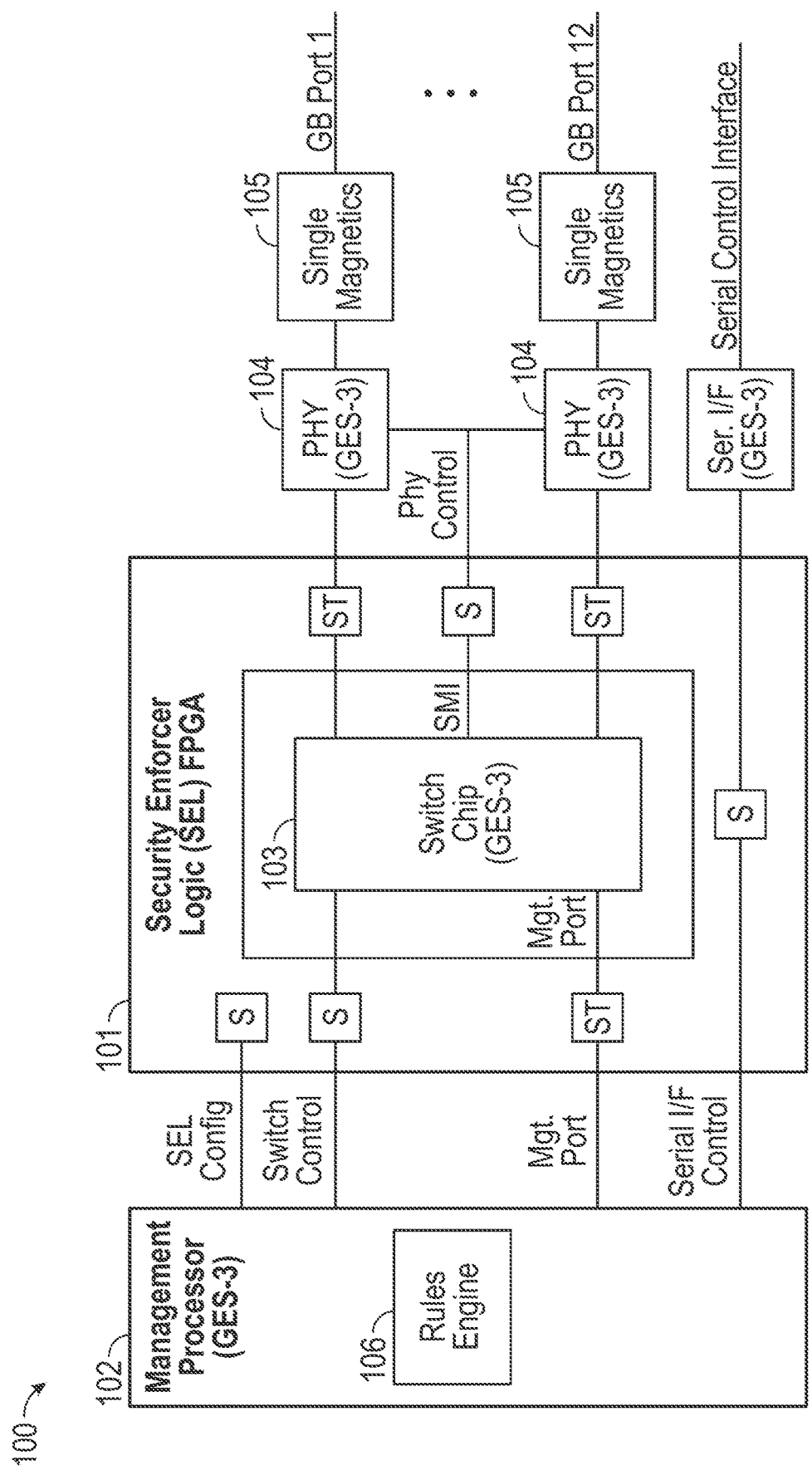
FIG. 1 is a block diagram of a multi-level secure switch according to an embodiment of the present invention.
Figure 2:
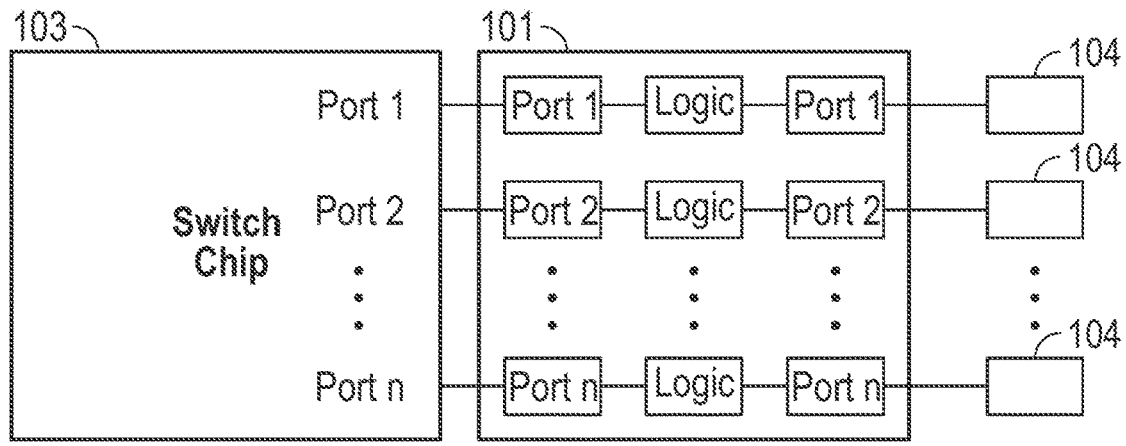
FIG. 2 is a block diagram including the data paths of the multi-level secure switch of FIG. 1.
Figure 3:
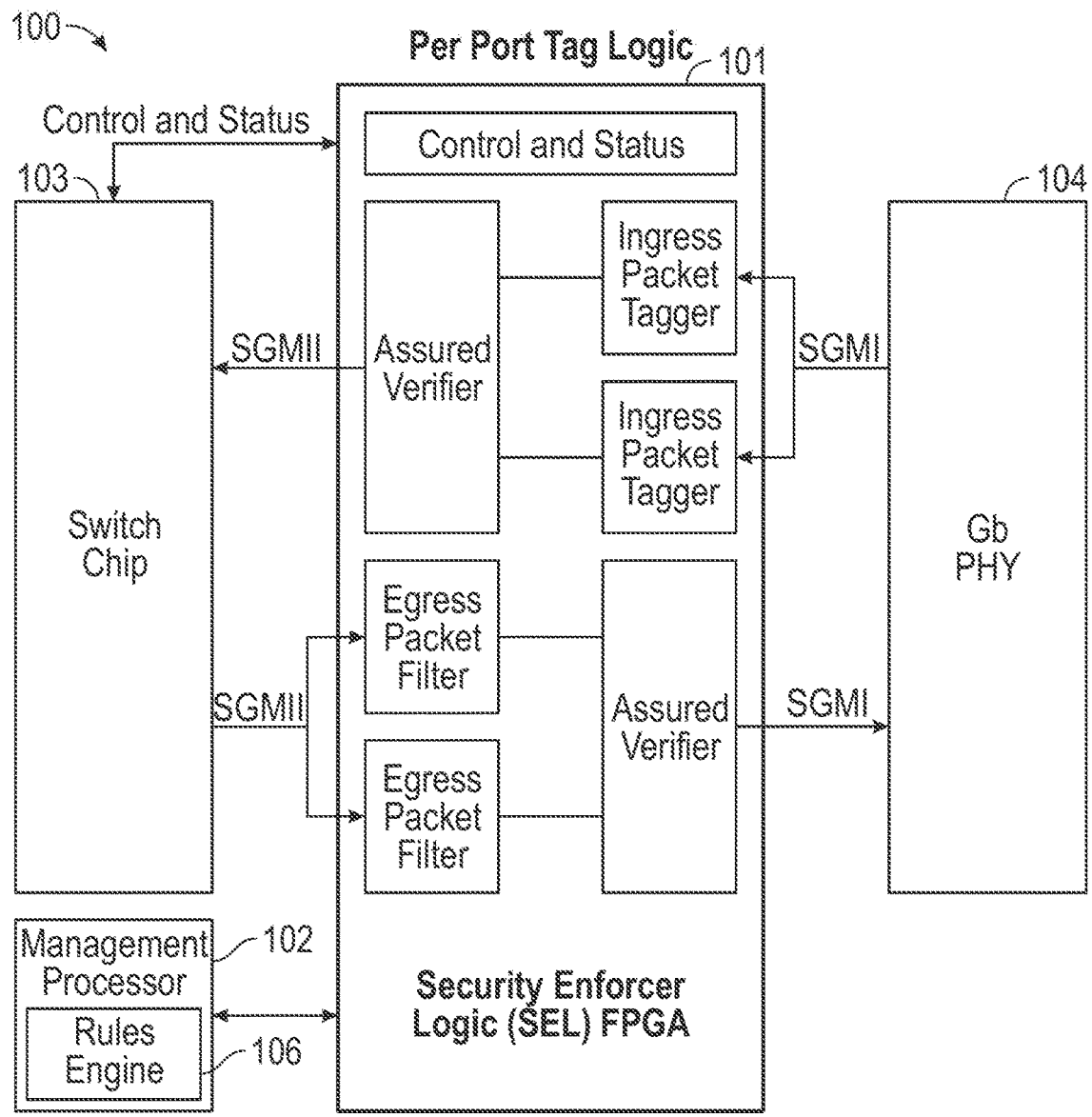
FIG. 3 is a block diagram of the security enforcer logic chip of the multi-level secure switch of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a multi-level secure switch 100 and method for using same. The multi-level secure switch 100 may be an apparatus for assured separation and handling of data packets within a switch, which may be an Ethernet switch, or router and may include a security enforcer logic chip 101, a management processor 102, a switch chip 103, and a plurality of physical ports 104. The multi-level secure switch 100 may be a multi-level security Aircraft Network Switch. The multi-level secure switch 100 may include built in test (BIT) modes, support for single and multi-level security (Secret & Unclassified) operational modes, signatures on software loads, internal memory sanitization, and switch flush modes.

The multi-level secure switch 100 may include a security enforcer logic chip 101, which may be a field programmable gate array (FPGA) adapted to implement and enforce Federal Information Processing Standard (F IPS) data tags and to provide security checks and balances to the other interfaces within a larger system. The security enforcer logic chip 101 may provide both physical and functional isolation between the management processor 102, the switch chip 103, and the plurality of physical ports 104.

Figure 4:
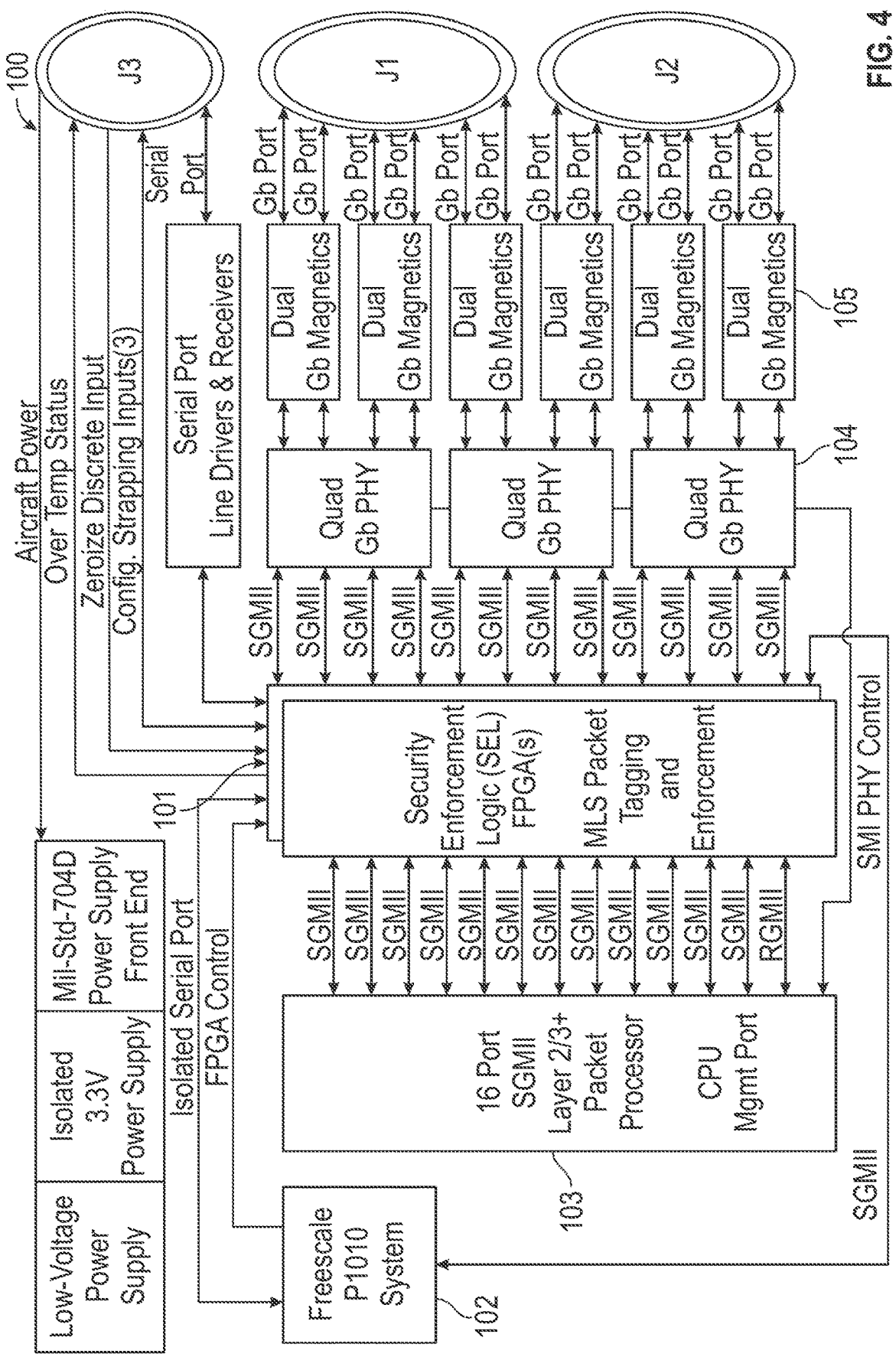
FIG. 4 is a block diagram of a multi-level secure switch according to another embodiment of the present invention.

As depicted in FIG. 4, the security enforcer logic chip 101 may have a dedicated data path associated with each of the plurality of physical ports 104, which may isolate data from every other physical port 104. The security enforcer logic chip 101 may have a dedicated data path associated with each port of the switch chip 103, which may isolate data from every other port of the switch chip 103. Each dedicated data path may be associated with exactly one physical port 104 and one port of the switch ship 103. The security enforcer logic chip 101 may be adapted to validate data on any given data path to ensure the data is the appropriate security level for the physical port 104 or port of the switch chip 103 associated with the data path.

The multi-level secure switch 100 may advantageously switch data packets between a plurality of physical ports 104 and provide a high data rate and low latency. The inclusion of a security enforcer chip 101, which is physically separate from the management processor 102, may advantageously remove the multi-level separation burden from the management processor 102, provide flexibility, and eliminate the need for expensive secure operating systems that are required on prior multi-level secure switches.

As depicted in FIG. 1, the multi-level secure switch 100 may include a switch chip 103, a management processor 102, and a security enforcer logic chip 101. Each of the switch chip 103, management processor 102, and security enforcer logic chip 101 may be separate, discrete integrated circuit chips. The security enforcer logic chip 101 may be adapted to ensure that data of differing classification levels remains isolated within the multi-level secure switch 100 and is not provided to an unauthorized physical port 104 or to the management processor 102. The security enforcer logic chip 101 may be configured to receive a plurality of data packets, each of which may have an associated security level. The security enforcer logic chip 101 may interface directly with the switch chip 103 and each of the plurality of physical ports 104. The security enforcer logic chip 101 may receive or send a plurality of data packets from or to the switch chip 103 or any of the plurality of physical ports 104. There may be a plurality of data paths between the switch chip 103 and the security enforcer logic chip 101. Each of the plurality of data paths may be isolated from each of the other data paths. Each of the data paths may be associated with exactly one of the plurality of physical ports 104 and with exactly one of the inputs and outputs of the switch chip 103. The security enforcer logic chip 101 may provide a data packet to the switch chip 103 on the data path associated with the physical port 104 on which the data packet was received. The switch chip 103 may provide a data packet to the security enforcer logic chip on the data patch associated with the physical port 104 to which the security enforcer logic chip 101 will transmit the data packet.

Each of the plurality of physical ports 104 may have an associated security threshold. Data packets may be sent by the security enforcer logic chip 101 to any of the plurality of physical ports 104 only when the security level associated with the data packet is compatible with, that is, it meets or exceeds, the security threshold of the physical port 104 receiving the data packet. If a the switch chip 103 provides a data packet to the security enforcer logic chip 101 on a data path associated with a physical port 104 having a security level incompatible with the security threshold of the physical port 104, the security enforcer logic chip 101 will drop the data packet and direct the management processor 102 to log the event.

The switch chip 103 may be implemented by an ASIC chip, FPGA, or the like. In embodiments in which the switch chip 103 includes an ASIC, the ASIC may be produced by Broadcom®, Marvel®, Vitesse®, or the like. In embodiments in which the switch chip 103 includes an FPGA, the FPGA may be manufactured by Marvel®, Intel®, Xilinx®, Lattice Semiconductor®, or the like.

The isolation of differing classification levels is accomplished with an assured tagging mechanism which is robustly checked by the security enforcer logic chip 101 on both ingress and egress of any data packet to or from the multi-level secure switch 100. The security enforcer logic chip 101 may implement an assured tagging mechanism to append to one or more data packets a security tag indicative of the security level of the data packet to which the security tag is appended. The assured tagging mechanism may apply and verify both FIPS and Commercial IP Security Option (CIPSO) security tags adhering to the FIPS188 tag specification. Each of the plurality of physical ports 104 of the multi-level secure switch 100 may be configured for egress security tag stripping or passing of data packets along with the appended security tag. In embodiments with egress security tag stripping, the security enforcer logic chip 101 may remove the appended security tag from the data packet prior to presenting the data packet to the physical port 104. In embodiments passing data packets along with the appended security ta, the security enforcer logic chip 101 may pass the data packet to the physical port 104 with the security tag appended. The appended security tags may be bound with high integrity to data packets while in the multi-level secure switch 100 to ensure that no data packet contamination has occurred. Appending of security tags may be optional and configuration of whether or not to append security tags to received data packets and whether or not to strip security tags from transmitted data packets may be controlled independently for each of the plurality of physical ports 104. In one embodiment, each of the plurality of data packets received by the security enforcer logic chip 101 may be appended with a security tag by the security enforcer logic chip 101. In another embodiment, only data packets received by one or more specific physical ports 104 may be appended by the security enforcer logic chip 101 with security tags. Similarly, data packets transmitted to every physical port 104 or only to specified physical ports 105 may be transmitted with security tags. Security tags may be stripped from a data packet by the security enforcer logic chip 101 prior to transmitting the data packet to the physical port 104 or the data packet may retain the appended security tag when the data packet is provided to the physical port 104.

Each of the plurality of physical ports 104 may be associated with a security threshold. Each outgoing data packet passing from the security enforcer logic chip 101 to a physical port 104 may be verified by the security enforcer logic chip 101 to have the appropriate security level for the security threshold associated with that physical port 104. The security enforcer logic chip 101 may examine the security tag of each of the data packets received from the switch chip 103 and may drop each data packet, rather than provide it to a physical port 104, when the security tag value of the data packet does not meet the security threshold parameters associated with the physical port 104 for which the data packet is intended. The security enforcer logic chip 101 may verify the security level of each data packet to assure the data packet security level is compatible with the security threshold associated with the physical port 104 to which the data packet is to be provided. The security threshold value for each of the plurality of physical ports 104 of the multi-level secure switch 100 may be configured for a single security level value of data or multiple security level values of data. In embodiments in which the security threshold is configured for a single security level values, only data packets having the configured value of security level may be provided to the physical port 104 by the security enforcer logic chip 101 and only data packets having the configured value of security level may be provided to the switch chip 103 by the security enforcer logic chip 101.

In another embodiment, security levels may fall along a spectrum, which would provide that security level values equal to and above, above, equal to and below, or below the security threshold may be provided by the security enforcer logic chip 101 to the physical port 104 associated with the security threshold. Similarly only data packets having security level values equal to and above, above, equal to and below, or below the security threshold of the physical port 104 on which the data packet was received may be provided by the security enforcer logic chip 101 to the switch chip 103.

The security level of each data packet may be determined by the value of the security tag appended to the data packet. The security enforcer logic chip 101 may examine the security tag of each of the plurality of data packets received from the switch chip 103 and provide each of the plurality of data packets to one of the plurality of physical ports 104 only when the value of the security tag appended to the data packet meets the security threshold of the receiving physical port 104. The security threshold may be defined as accepting data packets associated with security levels only equal to a single value. In another embodiment, the security threshold may be defined as accepting data packets associated with security levels associated with a plurality of values, which may be required to be equal to, greater than, or less than a single security level. The security threshold may be configured by the rules engine 106. Data packets having an inappropriate security level value for the physical port 104 associated with the data path on which the data packet is traveling may be dropped, an error condition may be logged, and the management processor 102 may be notified.

The security enforcer logic chip 101 may securely aid the management processor 102 in implementing certain protocols, including, but not limited to, signal transfer point (STP). The management processor 102 may be a microprocessor, microcontroller, central processing unit, or the like. In one embodiment, the management processor may be a QorIQ® P1010 processor or the like. The management processor 102 may be configured to interface directly with the security enforcer logic chip 101 and provide control signals to the security enforcer logic chip 101 while not receiving data packets from the security enforcer logic chip 101 except for in instances in which the data packet is specifically designated for receipt by the management processor 102. This configuration may enable the management processor 102 to remain at the security level of the serial communications interface (SCI) and eliminate the need for a multiple independent levels of security (MILS) operating system in the management processor 102. Advantageously, this configuration does not preclude the use of a MILS operating system when desired.

In one embodiment, the multi-level secure switch 101 may include 12 physical ports 104. Each of the physical ports 104 may have a physically separate path through an associated magnetic isolation transformer 105, with which the physical port 104 may be in electrical communication, to the security enforcer logic chip 101. A plurality of physical ports 104 may be integrated on a single physical link layer device (PHY). In one embodiment, a quad PHY may be utilized to implement at least a portion of the plurality of physical ports 104. Similarly, single or dual PHYs may be utilized. In one embodiment, no PHYs may be utilized. The inputs and outputs of the plurality of physical ports 104 may be routed to the security enforcer logic chip 103.

The security enforcer logic chip 103 may be implemented by a field programmable gate array (FPGA), application-specific integrated circuit (ASIC), or the like. In one embodiment, the security enforcer logic chip may be implemented in a Xilinx® FPGA. The security enforcer logic chip 103 may enforce the security policies of the multi-level secure switch 100 as configured by the rules engine 106. The security enforcer logic chip 103 operational modes may include Single Level Security (SLS) or Multi-Level Security (MLS) mode. During SLS operation, there may be no requirement for appending security tags or maintaining separation of data packets of different security levels on isolated data paths. In this mode, the security enforcer logic chip 101 may be adapted to pass data packets between the switch chip 103 and a plurality of physical ports 104 unmodified. In contrast, MLS operation may provide ingress security tagging and/or egress security tag verification. The security enforcer logic chip 101 may append data packets with FIPS 188 compliant security tags upon ingress to the security enforcer logic chip 101 and may also perform an integrity assurance check on the data packet upon ingress. The security level of the FIPS 188 compliant data packet, as indicated by the value of the security tag, may be verified by the security enforcer logic chip 101 to be compliant with the security threshold of the physical port 104 to which the associated data packet is being transmitted prior to egress of the data packet from the security enforcer logic chip 101. The data packet may also be subject to an integrity assurance check by the security enforcer logic chip 101 prior to egress from the security enforcer logic chip 101. The security enforcer logic chip 101 may append the data packet with a security tag in compliance with CIPSO for IPv4 packets and with CALIPSO for IPv6 packets.

The security parameters for the security enforcer logic chip 101 to accept, provide, append, strip, or otherwise manipulate data received from or transmitted to each of the plurality of physical ports 104 may be individually configured. The physical port 104 security parameters may be provided to the security enforcer logic chip 101 by the management processor 102. In one embodiment, security parameters may be provided by the rules engine 106. Physical port security parameters which may be configured may include, but are not limited to, security threshold value, ingress tag appending, ingress tag checking, ingress security minimum level, ingress security maximum level, egress tag stripping, egress tag checking, egress security minimum level, egress security maximum level, and egress integrity value removal. Ingress tag appending, ingress tag checking, egress tag stripping, egress tag checking, and egress integrity value removal security parameters may have values of either on or off. Security level or threshold security parameters may have values equal to the corresponding security levels associated with each of the plurality of physical ports 104. When the ingress tag appending parameter is on, the security enforcer logic chip 101 may append a security tag to each data packet when the data packet enters the security enforcer logic chip 101. When the ingress tag appending parameter is off, the security enforcer logic chip 101 may not append a security tag to each data packet when the data packet enters the security enforcer logic chip 101. When the ingress tag checking parameter is on, the security enforcer logic chip 101 may check the security tag associated with each data packet to ensure integrity and security threshold compliance with the physical port 104 upon entry of the data packet to the security enforcer logic chip 101. When the ingress tag checking parameter is off, the security enforcer logic chip 101 may not check the value of the security level indicated by the security tag associated with each data packet upon entry of the data packet to the security enforcer logic chip 101. When the egress tag stripping parameter is on, the security enforcer logic chip 101 may remove the security tag appended to each data packet prior to egress of the data packet from the security enforcer logic chip 101. When the egress tag stripping parameter is off, the security enforcer logic chip 101 may pass the data packet, including the security tag appended to each data packet, out of the security enforcer logic chip 101. When the egress tag checking parameter is on, the security tag associated with each data packet may be checked to ensure integrity and security threshold compliance prior to egress of the data packet from the security enforcer logic chip 101. When the egress tag checking parameter is off, the security tag associated with each data packet may not be checked prior to egress of the data packet from the security enforcer logic chip 101. When the egress integrity value removal parameter is on, the integrity value appended to each data packet may be removed from the data packet by the security enforcer logic chip 101 prior to egress of the data packet from the security enforcer logic chip 101. When the egress integrity value removal is off, the integrity value appended to each data packet may pass out of the security enforcer logic chip 101 along with the data packet.

The multi-level secure switch 100 may have operational and non-operational modes. Non-operational modes may include, but are not limited to, startup, self-test, software load, and shutdown. During non-operational modes outputs from the security enforcer logic chip 101 may be disabled.

When the multi-level secure switch 100 is operating in MLS mode, a FIPS 188 compliant security tag may be appended to each data packet by the security enforcer logic chip 101 upon entry to the security enforcer logic chip 101. The data packet may then be routed through the switch chip 103 like any other piece of data. The FIPS 188 compliant security tag may have an integrity security attribute, which may utilize a security algorithm. In one embodiment, the integrity security attribute may utilize a 256 bit SHA-2 cryptographic hash function to bind the security tag to the data packet. The use of this integrity function and the mechanism for binding the security tag to the data packet may provide functional data separation for the multi-level secure switch 100. The integrity function application and verification of the data packets may both be implemented using redundant functionality and comparing the results between the redundant functionality. These functions may be isolated within the security enforcer logic chip 101 using proven assurance mechanisms.

In one embodiment, the security enforcer logic chip 101 may receive a data packet to which a security tag has been previously appended. In such an embodiment, the security enforcer logic chip 101 may verify the security tag and otherwise manipulate the data packet in the same manner as data packets which have security tags appended by the security enforcer logic chip 101.

To achieve internal integrity, a SHA-256 hash may be computed over both the security tag and the data packet to produce an integrity value. Computing the integrity value of both the data packet and its appended security tag may assure that when the data packet is verified no change has occurred in the tagged data packet. The computed integrity value may then be attached to the data packet for use within the switch chip 103.

All data leaving the switch chip 103 may be routed to the associated data path in the security enforcer logic chip 101. When operating in MLS mode, all security tags may be checked by the security enforcer logic chip 101 upon ingress to the security enforcer logic chip 101 to ensure that the data is of the appropriate security level for the intended physical port 104. The results of the redundant checking logic may be verified by the security enforcer logic chip 101 before the data packet is transmitted out of the security enforcer logic chip 101 to the physical port 104 and associated magnetic isolation transformer 105. This method of data tagging verification may ensure that only data packets of the appropriate security level are allowed out the appropriate physical ports 104. Failure to pass the verification indicates that data corruption has occurred. A failed verification check results in the data packet being destroyed, the event status log being incremented, and the management processor 102 being notified.

The security thresholds assigned to each of the plurality of physical ports 104 and the operating mode for the entire multi-level secure switch 100 may be controlled by a rules engine 106 of the management processor 102. The rules engine 106 may be adapted to provide security rules and a plurality of security parameters to the security enforcer logic chip 101.

The multi-level secure switch 100 may be commanded by either a serial interface or via specialized commands through an SCI interface over an Ethernet port, which may be configured for communication between the management processor 102 to a mission computer external to the multi-level secure switch 100.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A multi-level secure switch comprising:
   a security enforcer logic chip configured to receive and transmit a plurality of data packets, each of the plurality of data packets having an associated security level, wherein the security enforcer logic chip comprises:
      a plurality of data paths, wherein each of the plurality of data paths connects a single port of a plurality of ports of a switch chip to a single physical port of a plurality of physical ports;
   the switch chip configured to send the plurality of data packets to and receive the plurality of data packets from the security enforcer logic chip, wherein the switch chip dynamically routes each of the plurality of data packets received from the security enforcer logic chip to the associated data path of the security enforcer logic chip and the switch chip comprises the plurality of ports of the switch chip;
   a management processor configured to provide security parameters to the security enforcer logic chip; and
   the plurality of physical ports, wherein each of the physical ports of the plurality of physical ports has an associated security threshold, wherein the plurality of physical ports are configured to send the plurality of data packets to and receive the plurality of data packets from the security enforcer logic chip; and
   wherein the security enforcer logic chip is configured to prevent transmission of one of the plurality of data packets to one of the plurality of physical ports when the security level associated with the one of the plurality of data packets is incompatible with the security threshold associated with the one of the plurality of physical ports;
   wherein the switch chip and the management processor are not in direct electronic communication with one another;
   wherein the management processor comprises a rules engine adapted to provide security parameters to the security enforcer logic chip;
   wherein the security enforcer logic chip is adapted to append a security tag, indicative of the security level, to each of the plurality of data packets;
   wherein the security enforcer logic chip examines the security tag appended to each of the plurality of data packets received from the switch chip and provides each of the plurality of data packets to one of the plurality of physical ports only when the security tag of the data packet meets the security threshold associated with the physical port;
   wherein the security enforcer logic chip examines the security tag appended to each of the plurality of data packets received from the switch chip and drops each of the plurality of data packets when the security tag appended to the data packet does not meet the security threshold of the physical port to which the data packet is to be transmitted;
   wherein the security enforcer chip is physically separate from the management processor; and
   wherein each of the plurality of data paths of the security enforcer logic chip is isolated from every other data path of the plurality of data paths of the security enforcer logic chip.

2. The multi-level secure switch according to claim 1 further comprising a plurality of magnetic isolation transformers; and
   wherein each of the plurality of magnetic isolation transformers is in electrical communication with only one of the plurality of physical ports.

3. The multi-level secure switch according to claim 1 wherein the switch chip is further configured to receive one of the plurality of data packets from the security enforcer logic chip and transmit the one of the plurality of data packets to a data path of the security enforcer logic chip associated with one of the plurality of physical ports.

4. The multi-level secure switch according to claim 3 wherein security enforcer logic chip verifies the security level of the one of the plurality of data packets is compatible with the security threshold associated with the one of the plurality of physical ports and wherein the security enforcer logic chip drops the one of the plurality of data packets when the security level of the one of the plurality of data packets is incompatible with the security threshold associated with the one of the plurality of physical ports.

5. The multi-level secure switch according to claim 1 wherein the security threshold may be defined as accepting data packets associated with a single security level; and
wherein the single security level may be configured by the rules engine.

6. The multi-level secure switch according to claim 1 wherein the security threshold may be defined as accepting data packets associated with a plurality of security levels; and
wherein the single security level may be configured by the rules engine.

7. The multi-level secure switch according to claim 1 wherein the security enforcer logic chip strips the security tag appended to each of the plurality of data packets received from the switch chip prior to transmitting the data packet to the physical port.

8. The multi-level secure switch according to claim 1 wherein the security enforcer logic chip retains the security tag appended to each of the plurality of data packets and transmits the security tag and the data packet to the physical port.

9. The multi-level secure switch according to claim 1 wherein the management processor is configured to receive one of the plurality of data packets only when the data packet is specifically designated for the management processor.

10. A method for multi-level secure switching comprising:
obtaining a switch comprising a security enforcer logic chip configured to receive and transmit a plurality of data packets, each of the plurality of data packets having an associated security level, wherein the security enforcer logic chip further comprises a plurality of data paths, wherein each of the plurality of data paths connects a single port of a plurality of ports of a switch chip to a single physical port of a plurality of physical ports, the switch chip configured to send the plurality of data packets to and receive the plurality of data packets from the security enforcer logic chip, wherein the switch chip dynamically routes each of the plurality of data packets received from the security enforcer logic chip to the associated data path of the security enforcer logic chip and the switch chip comprises the plurality of ports of the switch chip, wherein the switch further comprises a management processor configured to provide security parameters to the security enforcer logic chip and wherein the management processor comprises a rules engine adapted to provide security parameters to the security enforcer logic chip and wherein the switch further comprises the plurality of physical ports, wherein each of the physical ports of the plurality of physical ports has an associated security threshold, wherein the plurality of physical ports are configured to send the plurality of data packets to and receive the plurality of data packets from the security enforcer logic chip, wherein the switch chip and the management processor are not in direct electronic communication with one another, and wherein the security enforcer chip is physically separate from the management processor;
appending a security tag, indicative of the security level, to each of the plurality of data packets;
examining the security tag appended to each of the plurality of data packets received from the switch chip;
providing each of the plurality of data packets to one of the plurality of physical ports only when the security tag of the data packet meets the security threshold associated with the physical port;
preventing transmission of one of the plurality of data packets to one of the plurality of physical ports when the security level associated with the one of the plurality of data packets is incompatible with the security threshold associated with the one of the plurality of physical ports; and
isolating each of the plurality of data paths of the security enforcer logic chip from every other data path of the plurality of data paths of the security enforcer logic chip.

11. The method for multi-level secure switching according to claim 10 wherein the switch further comprises a plurality of magnetic isolation transformers; and
wherein each of the plurality of magnetic isolation transformers is in electrical communication with only one of the plurality of physical ports.

12. The method for multi-level secure switching according to claim 10 wherein the management processor comprises a rules engine adapted to provide security parameters to the security enforcer logic chip.

13. The method for multi-level secure switching according to claim 10 wherein the management processor is configured to receive one of the plurality of data packets only when the data packet is specifically designated for the management processor.

14. A multi-level secure switch comprising:
a security enforcer logic chip configured to receive a plurality of data packets, each having an associated security level, and to append a security tag, indicative of the security level, to each of the plurality of data packets, wherein the security enforcer logic chip comprises:
a plurality of data paths, wherein each of the plurality of data paths connects a single port of a plurality of ports of a switch chip to a single physical port of a plurality of physical ports;
the switch chip configured to interface with the security enforcer logic chip to receive one of the plurality of data packets and transmit the one of the plurality of data packets to one of a plurality of data paths of the security enforcer logic chip, wherein the switch chip dynamically routes each of the plurality of data packets received from the security enforcer logic chip to the associated data path of the security enforcer logic chip and the switch chip comprises the plurality of ports of the switch chip;
a management processor, having a rules engine adapted to provide security parameters to the security enforcer logic chip, configured to interface with the security enforcer logic chip, and configured to receive one of the plurality of data packets only when the data packet is specifically designated for the management processor; and
the plurality of physical ports, wherein each of the physical ports of the plurality of physical ports has an associated security threshold and each is configured to interface with one of the plurality of data paths; and
a plurality of magnetic isolation transformers;
wherein the security enforcer logic chip is adapted to examine the security tag of the one of the plurality of data packets received from the switch chip and provide the one of the plurality of data packets to one of the one of the plurality of physical ports only when the security tag of the data packet meets the security threshold associated with the one of the plurality of physical ports;

wherein the security enforcer logic chip examines the security tag of the one of the plurality of data packets received from the switch chip and drops the one of the plurality of data packets when the security tag of the data packet does not meet the security threshold associated with the one of the plurality of physical ports to which the data packet is to be transmitted;

wherein each of the plurality of magnetic isolation transformers is in electrical communication with only one of the plurality of physical ports;

wherein each of the plurality of paths is isolated from each of the other paths and each of the plurality of paths connects a single port of the switch chip with a single physical port;

wherein the switch chip and the management processor are not in direct electronic communication with one another;

wherein the security enforcer chip is physically separate from the management processor; and wherein each of the plurality of data paths of the security enforcer logic chip is isolated from every other data path of the plurality of data paths of the security enforcer logic chip.

\* \* \* \* \*